United States Patent [19]

Fling

[11] 4,224,959
[45] Sep. 30, 1980

[54] CLAMP FOR LIQUID-DISPENSING VALVE

[75] Inventor: James L. Fling, Portland, Oreg.

[73] Assignee: Custom Systems Associates, Inc., Portland, Oreg.

[21] Appl. No.: 61,363

[22] Filed: Jul. 27, 1979

[51] Int. Cl.³ .......................... F16K 31/44; F16L 3/00
[52] U.S. Cl. .................................. 137/343; 137/315; 251/78; 251/291; 222/504
[58] Field of Search ............... 137/343, 315, 327, 801; 251/291, 58, 63.4, 78; 222/504; 285/81; 403/234, 354, 373, 389

[56] References Cited

U.S. PATENT DOCUMENTS

| 2,511,844 | 6/1950 | Grove | 251/58 |
| 3,221,936 | 12/1965 | Spinuzza | 222/504 |
| 3,294,362 | 12/1966 | Schultz et al. | 222/509 |
| 3,354,672 | 11/1967 | Klaevi | 403/354 |
| 3,627,339 | 12/1971 | Burweger | 248/230 |
| 3,829,824 | 8/1974 | Pillischafske | 403/373 |
| 3,970,280 | 7/1976 | Kunz | 251/63.4 |

FOREIGN PATENT DOCUMENTS 1416461 12/1975 United Kingdom ................... 403/373

Primary Examiner—Martin P. Schwadron
Assistant Examiner—A. Michael Chambers
Attorney, Agent, or Firm—Kolisch, Hartwell & Dickinson

[57] ABSTRACT

A clamp usable in the mounting of a lever-actuated valve unit on a fitting, and in the operation of a lever on such unit when the unit is so mounted, where mounting is accomplishable through the rotation of a nut in the fitting relative to the valve unit, and lever actuation is accomplishable through the use of an actuator placed in a selected position adjacent the lever. The clamp includes a portion adapted for clamping onto the nut in the fitting, and an extension portion designed for use in rotating the clamp, with the latter clamped onto the nut. The extension portion is adapted for supporting the actuator, with the unit so mounted, in its selected position adjacent the lever.

3 Claims, 3 Drawing Figures

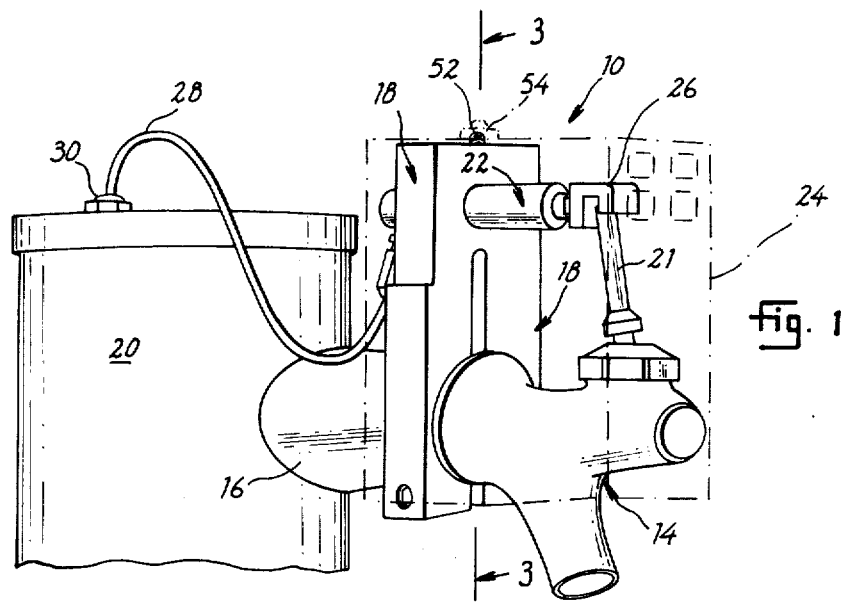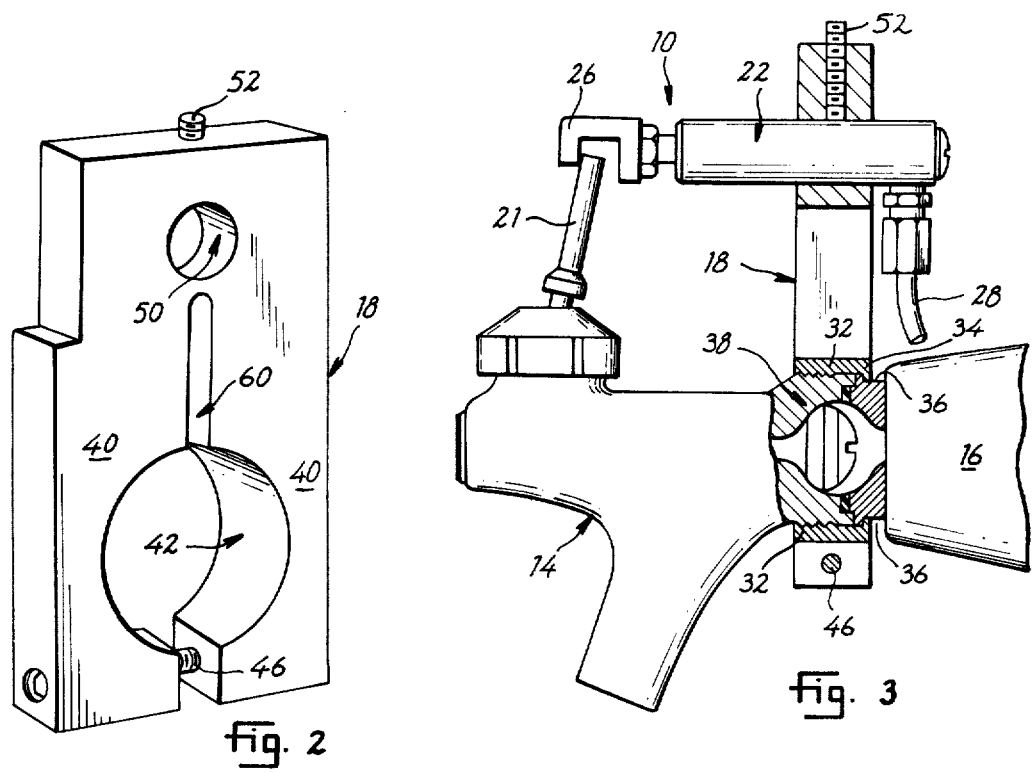

CLAMP FOR LIQUID-DISPENSING VALVE

BACKGROUND AND SUMMARY OF THE INVENTION

The present invention relates to clamping devices, and in particular, to a clamping device usable in a valving apparatus designed for remote-controlled dispensing of a foamable liquid, such as the apparatus disclosed in my companion application filed Aug. 28, 1978, Ser. No. 937,061, entitled "Valving Apparatus".

Describing very briefly the subject matter of the companion application, the apparatus disclosed therein includes a valve unit mounted on a valve fitting through the rotation of a nut in the fitting relative to the valve unit. The unit has an actuating lever shiftable to produce open and closed valve conditions. Attached to the valve unit, in a selected position relative thereto, is a pneumatic ram or pump operable, upon supply of pressurized gas thereto, to produce shifting of the actuating lever.

Also disclosed in the companion application is a clamp, or mounting unit, which is used as a tool in mounting the valving unit to the fitting, and used also as a structural element for supporting the ram at its selected position relative to the valve unit lever. This clamp, which forms the subject of the present application, includes a clamping portion for clamping onto the fitting nut, and an extension portion extending therefrom whereby torque can be applied to the nut in mounting the valve unit on the fitting. The extension portion is adapted to support the ram in the above-mentioned selected position when the clamp is moved to a position fully tightening the fitting on to the valve unit.

One important object of the clamp of the present invention is to facilitate coupling and uncoupling a valve unit and fitting in a remote-controlled valving apparatus of the type described above.

Another object is to provide, in a remote-controlled valving apparatus, a structural member which serves both as a tool for mounting the valving unit on the fitting, and as a support for a valve-actuating ram.

These and other objects and features of the present invention will become more fully apparent when read in connection with the following detailed description of a preferred embodiment of the invention and the accompanying drawings.

DRAWINGS

FIG. 1 is a side perspective view of a remote-controlled fluid-dispensing system employing the clamp of the present invention.

FIG. 2 is a perspective view of the clamp of the invention removed from other structure.

FIG. 3 is a partially sectional, partially cutaway view of the clamp and related parts—the view being taken generally along the line 3–3 in FIG. 1.

DETAILED DESCRIPTION OF A PREFERRED EMBODIMENT OF THE INVENTION

Referring now to the drawings, and particularly to FIGS. 1 and 3, there is shown at 10 a fluid-dispensing system which has been described fully in the above-mentioned companion patent application. Describing here only those features of system 10 necessary for an understanding of the instant clamp invention, the system generally includes a lever-actuated valve unit 14 which is coupled to the outer end of a fluid-supply projection, or fitting, 16 by use of the instant clamp 18, in a manner to be described. Fitting 16 extends radially from a side of a support tower 20 which mounts on a counter top of the like.

Unit 14 includes a projecting lever 21 which is shiftable between a first position, shown in FIGS. 1 and 3, wherein the lever is inclined rearwardly (toward fitting 16), and a second, forwardly inclined position. Movement of the lever between such first and second positions places the valve unit in closed and open conditions, respectively. Lever 21 is shifted by an actuator, including a pneumatic ram or pump 22 which is mounted adjacent the lever on clamp 18, in a manner to be described. Typically, valve unit 14 and ram 22 are enclosed within a protective housing 24 (shown in dash-dot lines in FIG. 1) detachably secured to the upper edge of the clamp.

Ram 22 is coupled to lever 21 by a somewhat U-shaped, inverted clevis 26. For purposes of understanding the invention described herein, it is important to note only that the clevis is dimensioned to receive the upper portion of lever 21 within its downwardly projecting arms. When pressurized fluid, such as compressed air, is supplied to ram 22 through a conduit 28, clevis 26 is shifted rapidly toward the left in FIG. 3, shifting lever 21 from its first to its second position, thus to open the valve.

Suitable supply tubes, or conduits supplying liquid to unit 14 through fitting 16, and supplying compressed air to conduit 28 from associated liquid and compressed-gas supply sources, respectively, are contained within tower 20. Conduit 28 is detachably connectable to such tower-contained gas-supply tube through a release-lock connector 30 on the top of the tower.

With reference to FIG. 3, fitting 16 includes a nut 32 rotatably attached to the left end of the fitting in the figure. Nut 32 has formed at its right in FIG. 3, a lip 34 which extends into a channel 36 formed in the fitting. Nut 32 is threaded internally to engage the threaded mounting portion 38 at the right end of the valve unit in FIG. 3. To mount unit 14 on fitting 16, the unit is placed adjacent the fitting, as shown, and nut 32 is rotated about the fitting, relative to the unit, until the two are secured tightly together.

Referring now to FIG. 2, clamp 18 generally includes an elongate body which is bifurcated along a portion of its length, from the lower edge in the figure, forming an opposed pair of arms 40 which can be yieldably moved toward and away from one another. A socket 42 formed centrally in the bifurcation, within the lower end of the body, is dimensioned for fitting about nut 32 on fitting 16, for a purpose to be described. A hexagon socket head set screw 46 threadedly coupling the lower portions of arms 40 in FIG. 2, is selectively rotatable to move the arms toward or away from one another to vary the side-to-side diameter of socket 42.

Formed in the upper, extension portion of the clamp body, above the upper end of the bifurcation in FIG. 2, is a fixed-diameter socket 50, dimensioned for receiving therein, and supporting ram 22 in a manner to be described. Provided for tightening ram 22 in socket 50 is a hexagon socket head set screw 52 located as shown.

The lower, clamping portion of the clamp body, including the portion thereof forming socket 42, is also referred to herebelow as clamping means, and the upper, extension portion of the body, above the socket, is also referred to herebelow as extension means joined to, and projecting from, the clamping means, for rotating the same with the latter clamped onto nut 32.

The function of clamp 18 in the above-described fluid-dispensing system will now be considered. Initially to secure the clamp to nut 32, the nut is fully tightened on portion 38 and the clamp is rotated, relative to the nut, to its vertically disposed position shown in FIGS. 1 and 3. Screw 46 is then tightened to establish this relative radial positioning between the nut and the clamp.

To effect the correct placement of ram 22 on the clamp, the latter, configured as just described, is back-rotated slightly, and ram 22 is placed in socket 50. The axial position of the ram is adjusted to produce the relative positioning between clevis 26 and lever 21, shown in FIG. 3. This axial position is maintained by tightening screw 52.

With nut 32 and ram 22 thus secured to clamp 18, valve unit 14 may be easily attached to fitting 16 by rotating the clamp and attached ram, to tighten nut 32 on portion 38, using the extending portion of the clamp for applying torque to the nut. With the nut fully tightened, clamp 18 is vertically disposed, as shown in FIGS. 1 and 3, and ram 22 is positioned, as discussed above, to place clevis 26 in operative engagement with the upper end of lever 21. Similarly, detaching unit 14 from the fitting is easily performed by back-rotating the clamp. It is noted here that during clamp rotation, it is necessary to detach the distal end of conduit 28 from connector 30.

It can now be appreciated how the above-stated objects of the present invention are met. Specifically, the clamp functions both as a tightening tool by which the valve unit can be easily and quickly attached to or detached from the fitting, and as a structural member for mounting the actuating ram at a position suitable for actuating the valve unit lever, when the valve unit is attached to the fitting.

While a specific embodiment of the present invention has been disclosed herein, various changes and modifications in the above-described clamp may be made without departing from the spirit of the invention.

It is claimed and desired to secure by Letters Patent:

1. Apparatus usable in combination with a projecting-lever-operated valve unit, a fitting for receiving the unit, and an actuator for operating the unit's projecting lever, where the unit further includes a threaded, mounting portion and the fitting carries a rotatable nut threadably engagable with such mounting portion to secure the nut and fitting, said apparatus comprising
    clamping means for clamping onto the nut,
    extension means joined to and projecting from said clamping means for rotating the same with the latter clamped onto the nut, thus to rotate the nut, rotation of said clamping means under such circumstances, and with the threads in the nut engaged with the valve unit's mounting portion, effecting tightening of the nut on the mounting portion, and consequently, securing of the valve unit and the fitting, and
    means formed in said extension means for receiving and supporting said actuator, and for positioning the actuator to enable operation thereby of the valve unit's lever under circumstances with the clamping means clamped onto the nut, and the nut tightened onto the valve unit's mounting portion.

2. The apparatus of claim 1 which takes the form of an elongate body, and wherein said clamping means is formed in a bifurcation extending along a portion of the length of said body.

3. The apparatus of claim 2, wherein said clamping means includes a socket formed in said bifurcation, and wherein said actuator receiving and supporting means includes a socket spaced from said bifurcation.

* * * * *